United States Patent
Rivers et al.

(10) Patent No.: US 9,759,095 B2
(45) Date of Patent: Sep. 12, 2017

(54) GAS TURBINE ENGINE ACCESS PANEL

(71) Applicant: Rolls-Royce Corporation, Indianapolis, IN (US)

(72) Inventors: Jonathan M. Rivers, Danville, IN (US); Roy D. Fulayter, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 985 days.

(21) Appl. No.: 14/145,488

(22) Filed: Dec. 31, 2013

(65) Prior Publication Data

US 2014/0294581 A1 Oct. 2, 2014

Related U.S. Application Data

(60) Provisional application No. 61/774,548, filed on Mar. 7, 2013.

(51) Int. Cl.
*F01D 25/24* (2006.01)
*F02C 7/04* (2006.01)
(Continued)

(52) U.S. Cl.
CPC .............. *F01D 25/24* (2013.01); *B23P 15/04* (2013.01); *B64D 29/08* (2013.01); *F02C 7/04* (2013.01);
(Continued)

(58) Field of Classification Search
CPC . F01D 25/24; F02K 3/06; F02K 3/062; F02K 3/065; B64D 29/08; B64D 33/02;
(Continued)

(56) References Cited

U.S. PATENT DOCUMENTS 2,494,347 A * 1/1950 Matthews .............. B64D 29/08
16/260
2,546,153 A * 3/1951 De Remer ............. B64D 33/02
123/41.7

(Continued)

FOREIGN PATENT DOCUMENTS

| EP | 1998012 A2 | 3/2008 | |
| GB | 499846 A * | 1/1939 | ............. B64D 29/08 |
| GB | 2201732 A * | 9/1988 | ............... F01D 5/30 |

OTHER PUBLICATIONS

International Search Report for PCT International Application Serial No. PCT/US2013/078526, completed Jun. 3, 2014.

(Continued)

*Primary Examiner* — Gregory Anderson
*Assistant Examiner* — Christopher R Legendre
(74) *Attorney, Agent, or Firm* — Barnes & Thornburg, LLP

(57) ABSTRACT

An integrated access panel is disclosed that can be used to assist in adjusting a component like a fan blade of a turbofan engine. in one form the integrated access panel is hinged at one end such that the panel remains attached during adjustment of the fan blade. The access panel can be positioned in an angled flow surface of a nacelle such that the fan blade cannot be removed from a wheel without removal of the nacelle or opening of the access panel. The integrated access panel can be spring-loaded and positioned to allow the fan blade to be removed from a wheel by moving the access panel out of the way. Subsequent blade removal can occur by rotation of the wheel to locate another blade in proximity to the access panel.

16 Claims, 3 Drawing Sheets

(51) Int. Cl.
  *F02K 3/06* (2006.01)
  *B64D 29/08* (2006.01)
  *B64D 33/02* (2006.01)
  *B23P 15/04* (2006.01)

(52) U.S. Cl.
  CPC ...... *B64D 33/02* (2013.01); *B64D 2033/0273* (2013.01); *F02K 3/06* (2013.01); *Y10T 29/49238* (2015.01)

(58) Field of Classification Search
  CPC ...... B64D 2033/022; B64D 2033/0273; B64D 2033/0286; B64D 2033/0293; F04D 29/403; F04D 29/526; F04D 29/644; Y10T 29/49238
  See application file for complete search history.

(56) References Cited

U.S. PATENT DOCUMENTS

| | | | | |
|---|---|---|---|---|
| 2,851,214 | A * | 9/1958 | Busquet | F04D 29/646 415/129 |
| 3,222,863 | A * | 12/1965 | Klees | F02C 7/042 138/43 |
| 3,446,223 | A * | 5/1969 | Hancock | F02C 7/042 137/15.2 |
| 3,618,876 | A * | 11/1971 | Skidmore | F02C 7/042 137/15.1 |
| 3,662,556 | A * | 5/1972 | Poucher | F02C 7/045 137/15.1 |
| 3,664,612 | A * | 5/1972 | Skidmore et al. | B64D 33/02 137/15.1 |
| 3,736,750 | A * | 6/1973 | Britt | F02C 7/045 137/15.1 |
| 3,747,341 | A * | 7/1973 | Davis | F02K 3/06 239/265.31 |
| 4,132,240 | A * | 1/1979 | Frantz | B64D 33/02 137/15.1 |
| 4,734,007 | A | 3/1988 | Perry | |
| 4,865,268 | A * | 9/1989 | Tracksdorf | B64D 33/02 137/15.2 |
| 5,213,475 | A * | 5/1993 | Peterson | F01D 5/02 416/219 R |
| 5,249,417 | A * | 10/1993 | Duesler | F01D 25/285 248/596 |
| 5,501,575 | A * | 3/1996 | Eldredge | F01D 5/3015 416/144 |
| 5,685,693 | A | 11/1997 | Sexton et al. | |
| 5,779,442 | A | 7/1998 | Sexton et al. | |
| 5,906,473 | A | 5/1999 | Sexton et al. | |
| 6,113,349 | A | 9/2000 | Bagepalli et al. | |
| 6,375,410 | B2 | 4/2002 | Clouse et al. | |
| 6,918,743 | B2 | 7/2005 | Gekht et al. | |
| 6,951,112 | B2 | 10/2005 | Czachor | |
| 7,510,369 | B2 | 3/2009 | Lytle | |
| 8,480,355 | B2 * | 7/2013 | Lore | B64D 29/08 415/126 |
| 9,126,691 | B2 * | 9/2015 | Cloft | B64D 29/08 |
| 9,279,342 | B2 * | 3/2016 | Davi | F01D 25/24 |
| 2008/0072572 | A1 | 3/2008 | Beutin et al. | |
| 2009/0129922 | A1 | 5/2009 | Cloft et al. | |
| 2011/0142608 | A1 | 6/2011 | Derenes et al. | |
| 2014/0294581 | A1 * | 10/2014 | Rivers | F01D 25/24 415/214.1 |
| 2015/0226231 | A1 * | 8/2015 | Murdock | F04D 29/403 60/726 |

OTHER PUBLICATIONS

Invitation to Pay Additional Fees and, Where Applicable, Protest Fee for PCT International Application Serial No. PCT/US2013/078526, dated Apr. 2, 2014, (5 pages).

* cited by examiner

GAS TURBINE ENGINE ACCESS PANEL

CROSS REFERENCE TO RELATED APPLICATIONS

This application claims priority to and the benefit U.S. Provisional Patent Application No. 61/774,548, filed on Mar. 7, 2013, the disclosure of which is now expressly incorporated herein by reference,

TECHNICAL FIELD

The present disclosure generally relates to gas turbine engine installation and/or maintenance, and more particularly, but not exclusively, to access panels used during installation and/or maintenance.

BACKGROUND

Accessing and adjusting components associated with gas turbine engines remains an area of interest. Some existing systems have various shortcomings relative to certain applications. Accordingly, there remains a need for further contributions in this area of technology.

SUMMARY

The present application discloses one or more of the features recited in the appended claims and/or the following features which, alone or in any combination, may comprise patentable subject matter.

One embodiment of the present invention is a unique access panel for a gas turbine engine. Other embodiments include apparatuses, systems, devices, hardware, methods, and combinations for accessing components associated with a gas turbine engine. Further embodiments, forms, features, aspects, benefits, and advantages of the present application shall become apparent from the description and figures provided herewith.

These and other features of the present disclosure will become more apparent from the following description of the illustrative embodiments.

DETAILED DESCRIPTION OF REPRESENTATIVE EMBODIMENTS

Figure 1:
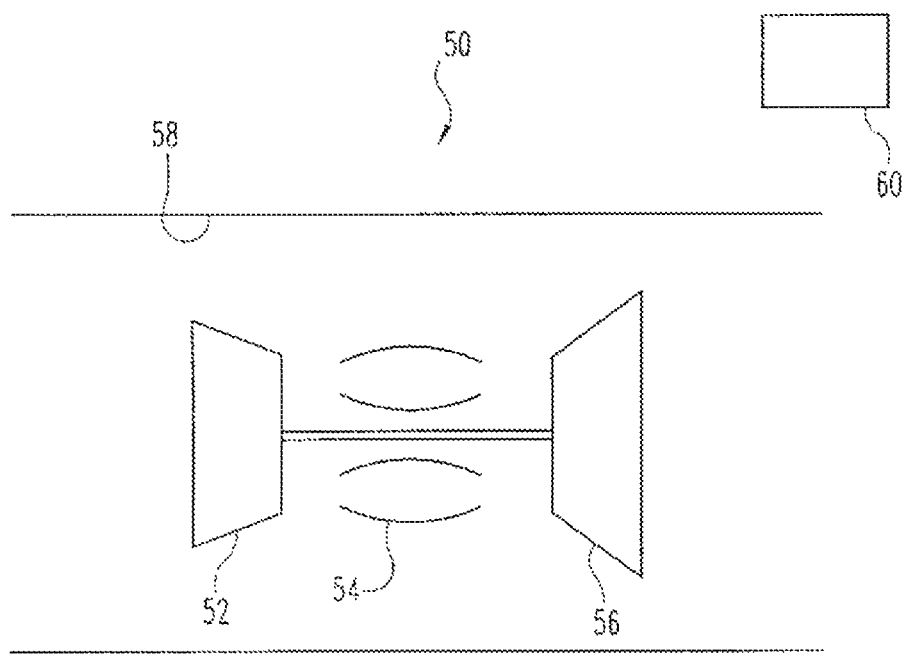
FIG. 1 depicts an embodiment of a gas turbine engine.

For the purposes of promoting an understanding of the principles of the disclosure, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the disclosure as described herein are contemplated as would normally occur to one skilled in the art to which the disclosure relates.

With reference to FIG. 1, a gas turbine engine 50 includes a compressor 52, a combustor 54, and a turbine 56 disposed internal to a flow surface 58. The gas turbine engine 50 can be used to provide power to an aircraft 60. As used herein, the term "aircraft" includes, but is not limited to helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosure is contemplated for use in other applications that may not be coupled with an aircraft such as, for example, industrial applications, power generation, pumping sets, naval propulsion, weapon systems, security systems, perimeter defense/security systems, and the like known to one of ordinary skill in the art.

Though the gas turbine engine 50 is depicted as a single spool turbojet engine, the engine 50 can take a variety of other forms. For example, any number of additional turbomachinery components can be used in or with the gas turbine engine 50. In some forms the engine 50 can be a multi-spool engine in the form of a turbofan, turboshaft, or turboprop engine. The engine 50 can furthermore be a variable and/or adaptive cycle engine. In short, the engine 50 can be of a variety of different configurations.

In one form the flow surface 58 is a nacelle used to enclose a gas turbine engine, but not all embodiments of the flow surface 58 are limited to a nacelle. For example, the flow surface 58 could be any other portion of a surface disposed in the gas turbine engine in proximity to turbomachinery components. The flow surface 58 can be configured parallel to an axis of rotation of one or more turbomachinery components, but in other forms can be formed at an angle relative to an axis of rotation. Further variations are depicted below.

Figure 2:
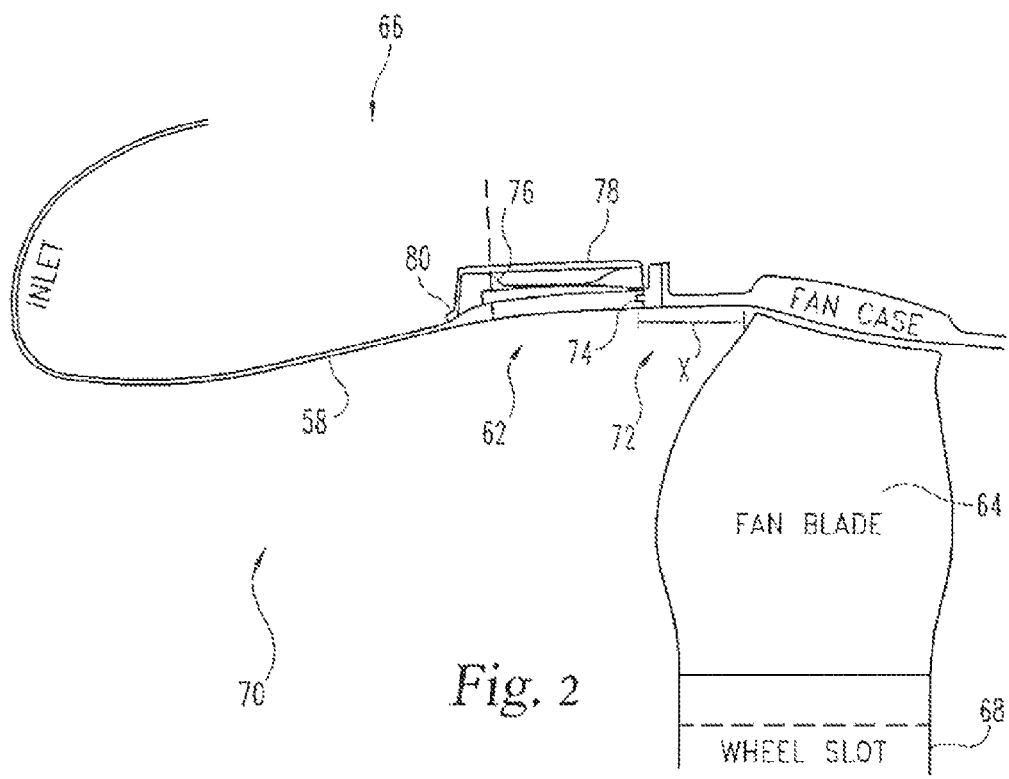
FIG. 2 depicts an embodiment of an integrated access panel.
Figure 3:
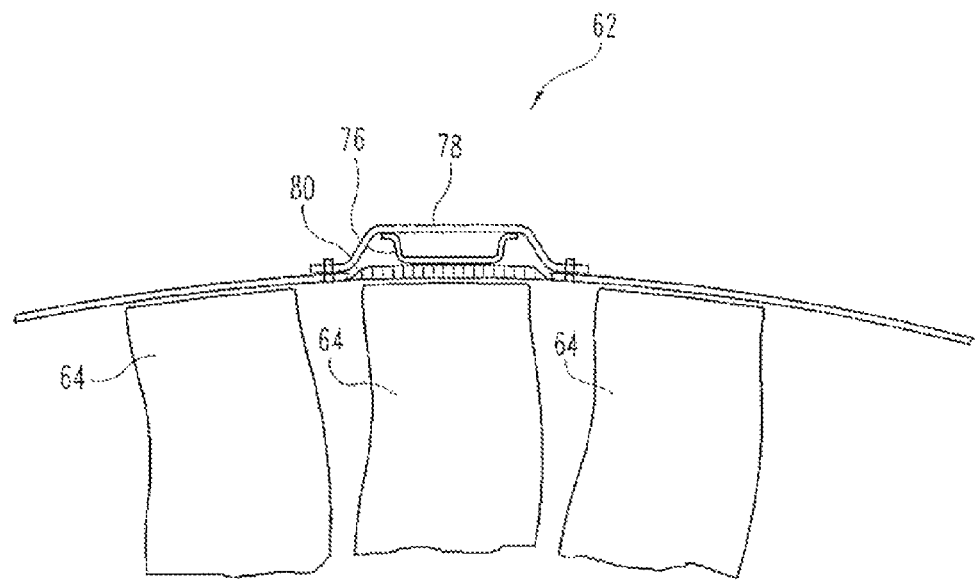
FIG. 3 depicts an embodiment of an integrated access panel; end

Turning now to FIGS. 2 and 3, one embodiment is shown of an integrated access panel 62 is shown that can be used to permit a component to be removed from, installed into, or adjusted within the gas turbine engine 50. For example, the component can be removed for purposes of repair, replacement, refurbishment, etc. In the illustrated embodiment the integrated access panel 62 is associated with a fan blade 64 of the gas turbine engine 50 and is located with a nacelle 66 useful to enclose the fan blade 64. The nacelle 66 can be used to form the flow surface 58 discussed above. The access panel 62 is located forward of the blade 64 in the illustrated embodiment but can be located elsewhere to permit the removal of the component.

In one form the access panel 62 can be used with a surface, such as the flow surface 58, that includes one or more portions oriented at an angle relative to a removal/installation direction of the component such as to impede removal and/or installation of the component. In the illustrated embodiment the flow surface 58 includes a forward portion 70 that is oriented at an angle relative to a rotation of the blade 64 such that the flow surface 58 impedes separation of the blade 64 from a wheel 68. The orientation of the flow surface 58 can be severe such that very little if any movement of the blade 64 can be made relative to the wheel 68, while in other embodiments the orientation of the flow surface 58 can be limited such that some amount of relative motion is permitted between the blade 64 and the wheel 68. In the illustrated embodiment the blade 64 is removed from the wheel 68 via a translation that is parallel with the axis of rotation of the wheel 68, but other embodiments can arrange the blade 64 to be removed from the wheel 68 in another direction.

The flow surface 58 of the illustrated embodiment can also include a free section 72 that permits some relative motion of the component prior to encountering an impeding orientation of a converging and/or diverging wall section. As shown in the figure, the free section 72 is in a cylindrical form that permits the blade 64 to be moved a relatively short distance prior to engaging the forward portion 70. The free section 72 can take on various sizes in any number of embodiments. Some embodiments of the flow surface 58 need not include a free section 72.

As will be illustrated further below, the integrated access panel 62 can be moved relative to the flow surface 58 while the component is removed, installed, adjusted, etc. and still remain attached to a structure associated with one or more of the engine 50 and aircraft 60. For example, in the illustrated form the access panel 62 is hinged to the flow surface 58 at hinge 74 which permits the access panel 62 to be pushed out of the way to permit the blade 64 to be separated from the wheel 68. Though the hinge 74 is located at an aft portion of the access panel 62, other locations are also contemplated herein. In some forms the access panel 62 includes a hinged, inter-locking configuration. Other types of connections other than hinges are also contemplated herein. It will therefore be appreciated that the access panel 62 can be connected to the flow surface 58 or other suitable structure of the engine 50 and/or aircraft 60 using any variety of techniques at any variety of locations.

An energy member such as a spring 76 can be used to urge the access panel 62 to a closed position. The energy member can take the form of a leaf spring as shown in the illustrated embodiment, but can also take on different forms in other embodiments. The energy member can be disposed between an outer portion of the access panel 62 and a structure such as a bracket 78. One or more energy members can be used to urge the outer portion toward the closed position. In addition, the energy members can be sized and/or configured to limit the movement of the access panel 62 in the open direction. Alternatively and/or additionally, a mechanical stop can be used with the access panel 62 to limit movement. The bracket 78 can be fastened to the nacelle in some forms and can be an integral component in others. In one non-limiting embodiment the bracket 78 is riveted in place, but other types of fasteners can also be used.

In some forms a seal 80 can be used to discourage the passage of working fluid across the access panel 62. The seal 80 can take any variety of forms and can be situated in various locations of the access panel 62. For example, the seal 80 can be disposed around one or more sides of the access panel 62. In some forms the seal can provide a force that opposes closure of the access panel 62 such that the energy member discussed above is used to overcome. Thus, the energy member can be sized sufficiently to urge the access panel 62 into the closed position in the presence of seal loads and loads imparted form a passing working fluid.

Figure 4:
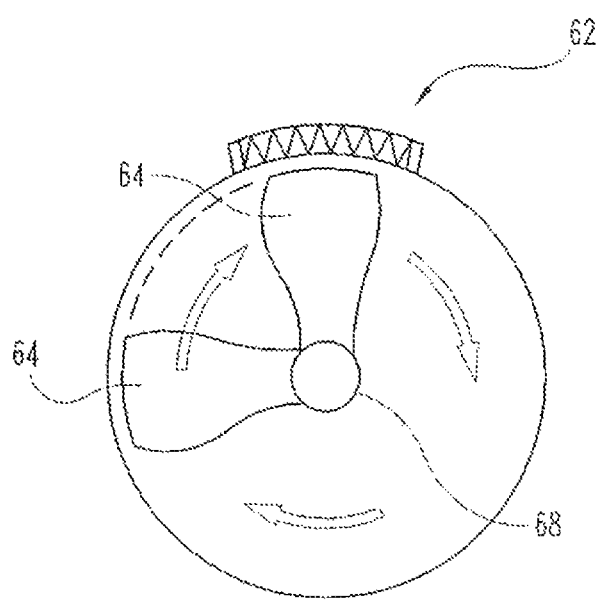
FIG. 4 depicts an embodiment of an integrated access panel.

The access panel 62 can be big enough to adjust one or more blades 64 without intervening rotation of the row of blades. Shown in FIG. 4 is an access panel 62 sized to permit a single blade 64 to be adjusted relative to the wheel 68. The access panel 62 can be urged to the open position and the blade 64 moved relative to the wheel 68. Though the illustrated embodiment depicts an access panel 62 sized to permit only a single blade 64 to be adjusted, some forms of the access panel 62 can be larger to permit additional blades to be adjusted.

When an owner, operator, technician, etc. wishes to adjust all blades 64 after adjusting an initial blade, the wheel 68 can be subsequently rotated to position another blade in proximity to the access panel 62 such that the next blade can be removed, installed, etc.

The integrated access panel 62 can take on a variety of shapes as viewed in a radial direction sufficient to permit a component, such as the blade 64, to be adjusted. In one non-limiting form the access panel 62 can take on a rectangular shape but other shapes are contemplated. For example, the access panel 62 can be trapezoidal, or triangular, among potential others. In some forms the access panel 62 can include one or more edges that are curved in appearance.

An aspect of the present application provides an apparatus comprising an aircraft nacelle inner flow surface having a blade removal panel movably connected to the aircraft nacelle such that the panel is capable of moving relative to the aircraft nacelle while remaining attached to the nacelle, the panel having a closed position in which the blade removal panel forms a flow path surface with the inner flow surface and an open position permitting a blade to be removed, the panel connected to the nacelle during the relative movement between the closed position and the open position.

A feature of the present application provides wherein the blade removal panel is located upstream of the blade on a diverging inner flow path surface such that when the blade is removed it would interfere with the diverging inner flow path surface unless the blade removal panel is moved from the closed position.

Another feature of the present application further includes a gas turbine engine integrated with the aircraft nacelle inner flow surface, and wherein the closed position creates a blockage for complete removal of a blade.

Yet another feature of the present application provides wherein the blade removal panel is movably connected to the aircraft nacelle using a hinge on one side of the panel.

Still another feature of the present application further includes a biasing member structured to urge the blade removal panel to the closed position.

Yet still another feature of the present application provides wherein the biasing member is an energy member capable of storing energy as a result of relative movement.

A further feature of the present application provides wherein the biasing member is sufficiently strong to counteract opposing forces from a seal used with the blade removal panel.

Another aspect of the present application provides an apparatus comprising a turbofan engine having a fan and an enclosure forming an inlet and defining a flow path to the fan, the fan having a plurality of blades that can be removed from an installed position by moving the blades relative to a rotatable blade retaining device, a maintenance access panel located in proximity to the installed position of the blades having a maintenance position configured to permit the a blade of the plurality of blades to be moved clear of the rotatable blade retaining device for removal from the turbofan engine, the maintenance access panel also having an operating position configured to permit the turbofan engine to be operated to produce a flow stream through the enclosure to the fan, and a biasing member positioned to urge the maintenance access panel to the operating position until a force is applied to the panel sufficient to move it to the maintenance position.

A feature of the present application provides wherein the maintenance access panel is connected to the enclosure in both the maintenance position and the operating position.

Another feature of the present application provides wherein the maintenance access panel is hinged at one end.

Yet another feature of the present application provides wherein the maintenance access panel is on an inner flow path surface of an aircraft nacelle which is oriented at an angle relative to a direction of removal for the blade of the plurality of blades.

Still yet another feature of the present application provides wherein the biasing member is a spring.

A further feature of the present application provides wherein the biasing member is structured to overcome a force generated by a seal placed with the maintenance access panel to discourage the transfer of a working fluid during operation of the turbofan engine.

Yet another aspect of the present application provides an apparatus comprising a gas turbine engine having a row of removable blades, an aircraft nacelle enclosing the row of removable blades, and nacelle panel means for removing a blade from the row of removable blades.

A feature of the present application provides wherein the nacelle panel means further includes means for urging the panel means to a closed position.

Still another aspect of the present application provides a method comprising rotating a row of removable gas turbine blades to a circumferential position for removing a blade, opening a nacelle access panel, compressing an energy member as a result of the opening, and moving the blade toward the nacelle access panel to remove the blade from the row of removable gas turbine engine blades.

A feature of the present application provides wherein the opening the nacelle access panel includes rotating the panel about an axis.

Another feature of the present application provides wherein, the rotating about an axis is at a downstream end of the nacelle access panel.

Still another feature of the present application further includes rotating the row of removable gas turbine engine blades to another circumferential position for removing another blade.

Yet still another feature of the present application further includes sealing the nacelle access panel.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may he contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    an aircraft nacelle including an inner flow surface; a blade removal panel movably connected to the aircraft nacelle such that the blade removal panel is capable of moving relative to the aircraft nacelle while remaining attached to the aircraft nacelle, the blade removal panel having a closed position in which the blade removal panel forms a flow path surface defining part of the inner flow surface and an open position permitting a blade to be removed, the blade removal panel connected to the aircraft nacelle during relative movement between the closed position and the open position, and
    wherein the blade removal panel is located upstream of a blade in a diverging portion of the inner flow surface such that while the blade is removed from a blade retaining device in a direction parallel to the axis of rotation it will interfere with the flow path surface when the blade removal panel is in the closed position and will not interfere with the flow path surface when the blade removal panel is in the open position.

2. The apparatus of claim 1, which further includes a gas turbine engine integrated with the inner flow surface, and wherein the closed position creates a blockage against complete removal of the blade.

3. The apparatus of claim 2, wherein the blade removal panel is movably connected to the aircraft nacelle using a hinge on one side of the blade removal panel.

4. The apparatus of claim 1, which further includes a biasing member structured to urge the blade removal panel to the closed position.

5. The apparatus of claim 4, wherein the biasing member is an energy member capable of storing energy as a result of relative movement.

6. The apparatus of claim 4, wherein the biasing member is sufficiently strong to counteract opposing forces from a seal used with the blade removal panel.

7. An apparatus comprising:
    a turbofan engine having a fan and an enclosure forming an inlet and defining a flow path to the fan, the fan having a plurality of blades that can be removed from an installed position by moving the plurality of blades relative to a rotatable blade retaining device;
    a maintenance access panel located in proximity to the installed position of the plurality of blades having a maintenance position configured to permit a blade of the plurality of blades to be moved clear of the rotatable blade retaining device for removal from the turbofan engine, the maintenance access panel also having an operating position configured to permit the turbofan engine to be operated to produce a flow stream through the enclosure to the fan;
    a biasing member positioned to urge the maintenance access panel to the operating position until a force is applied to the maintenance access panel sufficient to move it to the maintenance position, and
    wherein the maintenance access panel is on an inner flow path surface of the enclosure which is oriented at an angle relative to a direction of removal for the blade of the plurality of blades, the direction of removal being parallel to an axis of rotation of the rotatable blade retaining device.

8. The apparatus of claim 7, wherein the maintenance access panel is connected to the enclosure in both the maintenance position and the operating position.

9. The apparatus of claim 8, wherein the maintenance access panel is hinged at one end.

10. The apparatus of claim 7, wherein the biasing member is a spring.

11. The apparatus of claim 7, wherein the biasing member is structured to overcome a force generated by a seal placed with the maintenance access panel to discourage the transfer of a working fluid during operation of the turbofan engine.

12. A method comprising:
rotating a row of removable gas turbine blades to a circumferential position for removing a blade included in the row of removable gas turbine blades;
opening a nacelle access panel;
compressing an energy member during the opening the nacelle access panel; and
moving while the nacelle access panel is open, the blade toward the nacelle access panel to remove the blade from the row of removable gas turbine blades, wherein the nacelle access panel is on an inner flow path surface of an aircraft nacelle which is oriented at an angle relative to a direction of moving the blade, the direction of moving being parallel to an axis of rotation of the rotatable blade retaining device.

13. The method of claim 12, wherein the opening the nacelle access panel includes rotating the nacelle access panel about an axis.

14. The method of claim 13, wherein the axis is at downstream end of the nacelle access panel.

15. The method of claim 12, which further includes rotating the row of removable gas turbine blades to another circumferential position for removing another blade included in the row of removable gas turbine blades.

16. The method of claim 12, which further includes sealing the nacelle access panel with a seal located on the nacelle access panel.

* * * * *